(12) United States Patent
Roberts, III et al.

(10) Patent No.: US 10,592,871 B2
(45) Date of Patent: Mar. 17, 2020

(54) SUPPORT FOR MAINTENANCE OF A FLEET OF VEHICLES WITH INTUITIVE DISPLAY OF REPAIR ANALYTICS

(71) Applicant: THE BOEING COMPANY, Chicago, IL (US)

(72) Inventors: David M. Roberts, III, Tukwila, WA (US); Gregory Urbina, Tukwila, WA (US); Jennifer Marie Kansal, Tukwila, WA (US); Krupal Kiran Desai, Tukwila, WA (US)

(73) Assignee: The Boeing Company, Chicago, IL (US)

( * ) Notice: Subject to any disclaimer, the term of this patent is extended or adjusted under 35 U.S.C. 154(b) by 131 days.

(21) Appl. No.: 15/965,296

(22) Filed: Apr. 27, 2018

(65) Prior Publication Data

US 2019/0333026 A1 Oct. 31, 2019

(51) Int. Cl.
| | |
|---|---|
| *G06Q 10/00* | (2012.01) |
| *G07C 5/00* | (2006.01) |
| *G06F 3/0484* | (2013.01) |
| *G06Q 30/02* | (2012.01) |
| *G06F 16/903* | (2019.01) |
| *G06F 3/0482* | (2013.01) |

(52) U.S. Cl.
CPC ......... *G06Q 10/20* (2013.01); *G06F 3/04847* (2013.01); *G06F 16/90335* (2019.01); *G06Q 30/0283* (2013.01); *G07C 5/006* (2013.01); *G06F 3/0482* (2013.01)

(58) Field of Classification Search
CPC ................. G06Q 10/20; G06Q 30/0283; G06F 16/90335; G06F 3/04847; G06F 3/0482; G07C 5/006

USPC ........................................................ 701/29.3
See application file for complete search history.

(56) References Cited

U.S. PATENT DOCUMENTS

| | | | | |
|---|---|---|---|---|
| 7,349,825 B1* | 3/2008 | Williams | ............... | G06Q 10/06 702/182 |
| 2005/0222933 A1* | 10/2005 | Wesby | .................. | G06Q 40/00 705/36 R |
| 2008/0147264 A1* | 6/2008 | Doulatshahi | ........... | G06Q 10/06 701/29.5 |
| 2008/0208397 A1* | 8/2008 | Miklos | ................. | G06Q 10/087 701/3 |
| 2009/0187449 A1* | 7/2009 | van Tulder | ............ | G06Q 10/06 705/7.17 |

(Continued)

*Primary Examiner* — Muhammad Shafi
(74) *Attorney, Agent, or Firm* — Womble Bond Dickinson (US) LLP

(57) ABSTRACT

A method is provided for supporting maintenance of a fleet of vehicles with intuitive display of repair analytics. The method includes receiving a user request for repair analytics for the fleet of vehicles via a GUI that includes a first frame with a date-range filter to enable the user to select a date range for the repair analytics. The method includes interpreting the user request to produce a query of dataset(s) for the fleet, and executing the query for data of the vehicles. The datasets include an in-service time and repair costs for the vehicles, and the data includes the same over the date range. The method includes determining, and generating a chart in a second frame of the GUI that graphically illustrates, a moving average repair cost per unit of in-service time for a plurality of time periods within the date range from the in-service time and repair costs.

27 Claims, 6 Drawing Sheets

(56) References Cited

U.S. PATENT DOCUMENTS

2014/0059468 A1* 2/2014 Allgair ................ G06F 3/04842
                                                                715/771
2018/0164123 A1* 6/2018 Pineo ..................... G01C 21/20
2018/0335772 A1* 11/2018 Gorinevsky ....... G05B 23/0283

* cited by examiner

FIG. 3A

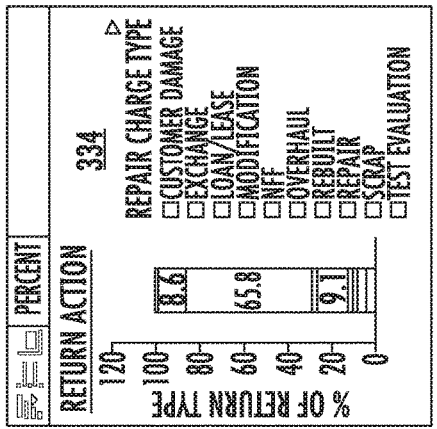
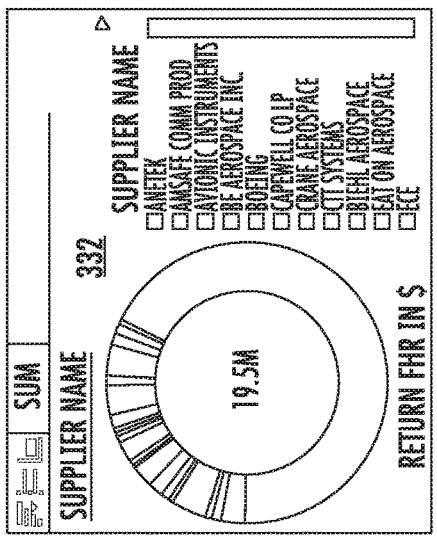

ACTUAL REPAIR COST & RELIABILITY CORE TABLE

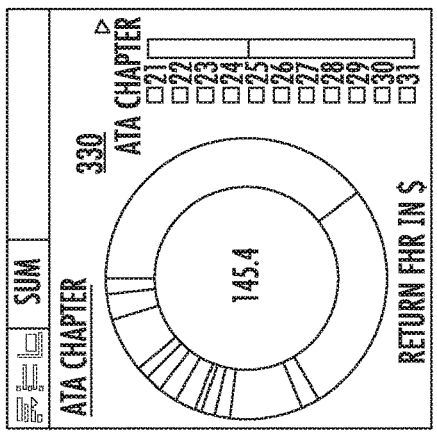

RELIABILITY CORE TABLE

| PART NAME | PART NUMBER | ATA CHAPTER | SUPPLIER NAME | QPA | REPAIR $ / FH | REPAIR $ / M | TOTAL HOURS | ACTUAL MTBUR |
|---|---|---|---|---|---|---|---|---|
| VAIRABLE FREQUENCY STARTER GENERATOR (VFSG) | 700133OH03 | 24 | HAMILTON SUNDSTRAND | 4 | 33.99 | 125,017.33 | 47,809 | 1,568 |
| CABIN AIR COMPRESSOR | 701010H07 | 21 | HAMILTON SUNDSTRAND | 4 | 2.30 | 112,633.85 | 635,539 | 52,962 |
| ICS SUPPLEMENTAL COOLING UNIT (SCU) | 701015H02 | 21 | HAMILTON SUNDSTRAND | 4 | 2.29 | 111,836.87 | 635,539 | 15,501 |
| RAM AIR FAN | 701013H09 | 21 | HAMILTON SUNDSTRAND | 2 | 20.39 | 74,973.87 | 47,809 | 3,084 |
| ICS MODULE, FAN, LARGE GALLEY COOLING UNIT (GCU) | 701105H01 | 21 | HAMILTON SUNDSTRAND | 7 | 1.00 | 49,110.22 | 635,539 | 153,406 |
| PUMP ASSY - POWER ELECTRONICS COOLING SYSTEM (PECS) | 701017OH03 | 21 | HAMILTON SUNDSTRAND | 2 | 10.72 | 41,987.02 | 50,907 | 3,182 |
| RAM AIR FAN MOTOR CONTROLLER (RFMC) | 701015OH02S0 | 21 | HAMILTON SUNDSTRAND | 2 | 8.97 | 32,999.39 | 47,807 | 5,976 |
| AIR CYCLE MACHINE | 701021H03 | 21 | HAMILTON SUNDSTRAND | 2 | .67 | 32,890.77 | 47,809 | 48,888 |
| COMPRESSOR, MOTOR DRIVEN (MDC) | 701203OH07 | 47 | HAMILTON SUNDSTRAND | 1 | 8.61 | 31,675.28 | 635,539 | 1,771 |
| ICS SUPPLEMENTAL COOLING UNIT (SCU) MOTOR CONTROLLER | 701104OH02 | 21 | HAMILTON SUNDSTRAND | 3 | .63 | 30,643.74 | 47,809 | 20,724 |
| PUMP, LIQUID COOLING - FCAC | 701615H02 | 21 | HAMILTON SUNDSTRAND | 1 | .59 | 28,900.44 | 635,539 | 42,369 |
| ELECTRO-MECHANICAL CONTROL UNIT (EMCU) | CA7271-004 | 27 | MOOG | 6 | 7.81 | 28,717.46 | 47,809 | 15,098 |

FIG. 3B

SUPPORT FOR MAINTENANCE OF A FLEET OF VEHICLES WITH INTUITIVE DISPLAY OF REPAIR ANALYTICS

TECHNOLOGICAL FIELD

The present disclosure relates generally to maintenance of a fleet of vehicles and, in particular, to supporting maintenance of a fleet of vehicles with intuitive display of repair analytics.

BACKGROUND

Maintenance is regularly performed on aircraft for repair, update or replacement of component parts to keep the aircraft in a safe condition for in-service operation. Performing maintenance has a direct effect on the in-service availability of aircraft, with it generally being desirable to reduce or minimize aircraft downtime during maintenance in which the aircraft is out of service. Reducing or minimizing aircraft downtime during maintenance is a complicated task involving multiple variables such as the model and series of aircraft, the airline, systems or structures of the aircraft, component parts, supplier of the component parts, the age or in-service time of the aircraft or component parts, and the like. The interplay of these variables makes reducing or minimizing aircraft downtime during maintenance challenging.

A dataset for a fleet of aircraft that includes data relevant to maintenance of the fleet contains large amounts of information. The size and complexity of aircraft and variables involved increase not only the time required to study the data, but the difficulty in comprehending the data. A user may not only require the time to review a dataset containing large amounts of data, but may also require the time and endure the difficulty of studying the data to understand the ways in which the data is driven by maintenance of the fleet and may be used to improve it.

BRIEF SUMMARY

Example implementations of the present disclosure are generally to maintenance of a fleet of vehicles and, in particular, to supporting maintenance of a fleet of vehicles with intuitive display of repair analytics. In accordance with example implementations, data for a fleet of vehicles such as aircraft may be filtered based on a number of different, relevant variables, and repair analytics may be arranged in a graphical user interface (GUI) in a manner that enables a user to see the data in a dashboard view that facilitates a better understanding of the data and its usefulness in improving maintenance of the fleet, such as by reducing or minimizing aircraft downtime during maintenance. The arrangement may not only lessen the time required to review dataset(s) containing large amounts of data, but may also lessen the time required and ease the difficulty studying the data to understand the ways in which maintenance of the fleet may be improved. Example implementations may therefore ease the difficulty and time required to search and comprehend even the most massive amounts of data contained in some datasets.

The present disclosure thus includes, without limitation, the following example implementations.

Some example implementations provide a method of supporting maintenance of a fleet of vehicles, the method comprising executing a computer-readable program code via processing circuitry to generate a graphical user interface (GUI) to enable a user to request and receive repair analytics for a fleet of vehicles, the GUI including a first frame within which a collection of filters are grouped, the collection of filters including a date-range filter with one or more graphical control elements to enable the user to select a date range for the repair analytics, and the GUI including a second frame within which at least some of the repair analytics are displayed; receiving a user request for repair analytics for the fleet of vehicles via the GUI, including user selection of the date range via the date-range filter; interpreting the user request to produce a query of one or more datasets for the fleet of vehicles, the one or more datasets including an in-service time for vehicles of the fleet of vehicles, and repair transactions including repair costs for the vehicles; executing the query of the one or more datasets for data of the vehicles of the fleet of vehicles, the data including the in-service time and the repair costs over the date range for the vehicles; determining a moving average repair cost per unit of in-service time for a plurality of time periods within the date range from the in-service time and the repair costs; and generating a moving-average-repair-cost (MARC) chart in the second frame of the GUI, the MARC chart graphically illustrating the moving average repair cost per unit of in-service time for the plurality of time periods.

In some example implementations of the method of any preceding example implementation, or any combination of any preceding example implementations, the vehicles of the fleet of vehicles are operated by vehicle operators, the collection of filters further include an operator filter with a second one or more graphical control elements to enable the user to select one or more of the vehicle operators that operate a subset of the vehicles, and the one or more datasets identify the vehicles by vehicle operator of the vehicle operators, and wherein receiving the user request further includes receiving user selection of the one or more of the vehicle operators via the operator filter, executing the query includes executing the query for the data including the in-service time and the repair costs for only the subset of the vehicles operated by the one or more of the vehicle operators, and determining the moving average repair cost per unit of in-service time includes determining the moving average repair cost per unit of in-service time for the plurality of time periods within the date range from the in-service time and the repair costs for only the subset of the vehicles.

In some example implementations of the method of any preceding example implementation, or any combination of any preceding example implementations, the vehicles of the fleet of vehicles include component parts of systems or structures of the vehicles, the collection of filters further include a system filter with a second one or more graphical control elements to enable the user to select one or more of the systems or structures that include a subset of the component parts, and the repair transactions in the one or more datasets identify the repair costs by component part of the component parts, and wherein receiving the user request further includes receiving user selection of the one or more of the systems or structures via the system filter, executing the query includes executing the query for the data including the in-service time and the repair costs for only the subset of the component parts in the one or more of the systems or structures, and determining the moving average repair cost per unit of in-service time includes determining the moving average repair cost per unit of in-service time for the plurality of time periods within the date range from the in-service time and the repair costs for only the subset of the component parts.

In some example implementations of the method of any preceding example implementation, or any combination of any preceding example implementations, the vehicles of the fleet of vehicles include component parts, the collection of filters further include a component-part filter with a second one or more graphical control elements to enable the user to select one or more of the component parts, and the repair transactions in the one or more datasets identify the repair costs by component part of the component parts, and wherein receiving the user request further includes receiving user selection of the one or more of the component parts via the component-part filter, executing the query includes executing the query for the data including the in-service time and the repair costs for only the one or more of the component parts, and determining the moving average repair cost per unit of in-service time includes determining the moving average repair cost per unit of in-service time for the plurality of time periods within the date range from the in-service time and the repair costs for only the one or more of the component parts.

In some example implementations of the method of any preceding example implementation, or any combination of any preceding example implementations, the vehicles of the fleet of vehicles include component parts supplied by component part suppliers, the collection of filters further include a supplier filter with a second one or more graphical control elements to enable the user to select one or more of the component part suppliers that supply a subset of the component parts, and the repair transactions in the one or more datasets identify the repair costs by component part of the component parts, and wherein receiving the user request further includes receiving user selection of the one or more of the component part suppliers via the supplier filter, executing the query includes executing the query for the data including the in-service time and the repair costs for only the subset of the component parts supplied by the one or more of the component part suppliers, and determining the moving average repair cost per unit of in-service time includes determining the moving average repair cost per unit of in-service time for the plurality of time periods within the date range from the in-service time and the repair costs for only the subset of the component parts.

In some example implementations of the method of any preceding example implementation, or any combination of any preceding example implementations, the GUI further includes a third frame within which at least some of the repair analytics are displayed, and the repair transactions in the one or more datasets identify the repair costs by charge type of a plurality of charge types for the repair costs, and wherein the method further comprises: determining a repair cost and percentage of number of repair transactions or total repair cost over the date range for each of the plurality of charge types from the repair costs for the vehicles; and generating a charge-type table in the third frame of the GUI, the charge-type table identifying the plurality of charge types, and the repair cost and percentage of number of repair transactions or total repair cost for each of the plurality of charge types.

In some example implementations of the method of any preceding example implementation, or any combination of any preceding example implementations, the vehicles of the fleet of vehicles include component parts of systems or structures of the vehicles, and the repair transactions in the one or more datasets identify the repair costs by component part of the component parts, wherein the first frame and the second frame are on a landing page of the GUI that also includes a further graphical control element that when user selected, causes display of a second page of the GUI within which further repair analytics are displayed, and the method further comprises: receiving user selection of the further graphical control element; determining a total repair cost per unit of in-service time over the date range for each of a select one or more of the systems or structures that include a subset of the component parts; and generating a system-structure chart on the second page of the GUI, the system-structure chart graphically illustrating numerical proportions of the total repair cost per unit of in-service time for the select one or more of the systems or structures.

In some example implementations of the method of any preceding example implementation, or any combination of any preceding example implementations, the vehicles of the fleet of vehicles include component parts supplied by component part suppliers, and the repair transactions in the one or more datasets identify the repair costs by component part of the component parts, wherein the first frame and the second frame are on a landing page of the GUI that also includes a further graphical control element that when user selected, causes display of a second page of the GUI within which further repair analytics are displayed, and the method further comprises: receiving user selection of the further graphical control element; determining a total repair cost over the date range for each of a select one or more of the component part suppliers that supply a subset of the component parts; and generating a part-supplier chart on the second page of the GUI, the part-supplier chart graphically illustrating numerical proportions of the total repair cost for the select one or more of the component part suppliers.

In some example implementations of the method of any preceding example implementation, or any combination of any preceding example implementations, the repair transactions in the one or more datasets identify the repair costs by charge type of a plurality of charge types for the repair costs, wherein the first frame and the second frame are on a landing page of the GUI that also includes a further graphical control element that when user selected, causes display of a second page of the GUI within which further repair analytics are displayed, and the method further comprises: receiving user selection of the further graphical control element; determining a percentage of number of repair transactions or total repair cost over the date range for each of the plurality of charge types from the repair costs for the vehicles; and generating a charge-type chart on the second page of the GUI, the charge-type chart graphically illustrating numerical proportions of the percentage of number of repair transactions or total repair cost for the plurality of charge types.

In some example implementations of the method of any preceding example implementation, or any combination of any preceding example implementations, the vehicles of the fleet of vehicles include component parts, and the repair transactions in the one or more datasets identify the repair costs by component part of the component parts, wherein the first frame and the second frame are on a landing page of the GUI that also includes a further graphical control element that when user selected, causes display of a second page of the GUI within which further repair analytics are displayed, and the method further comprises: receiving user selection of the further graphical control element; determining for each component part of at least a subset of component parts, a repair cost per unit of in-service time over the date range from the in-service time and the repair costs; and generating a component-part table on the second page of the GUI, the component-part table identifying the subset of the component parts and at least the repair cost per unit of in-service time over the date range for each component part of the subset of the component parts.

Some example implementations provide an apparatus for supporting maintenance of a fleet of vehicles. The apparatus comprises a non-transitory computer-readable storage medium storing computer-readable program code; and processing circuitry configured to access the non-transitory computer-readable storage medium, and execute the computer-readable program code to cause the apparatus to at least perform the method of any preceding example implementation, or any combination of any preceding example implementations.

Some example implementations provide a non-transitory computer-readable storage medium for supporting maintenance of a fleet of vehicles. The non-transitory computer-readable storage medium has computer-readable program code stored therein that in response to execution by processing circuitry, causes an apparatus to at least perform the method of any preceding or any subsequent example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

FIGS. 3A and 3B illustrate a landing page and second page of a GUI, according to example implementations;

DETAILED DESCRIPTION

Figure 1:
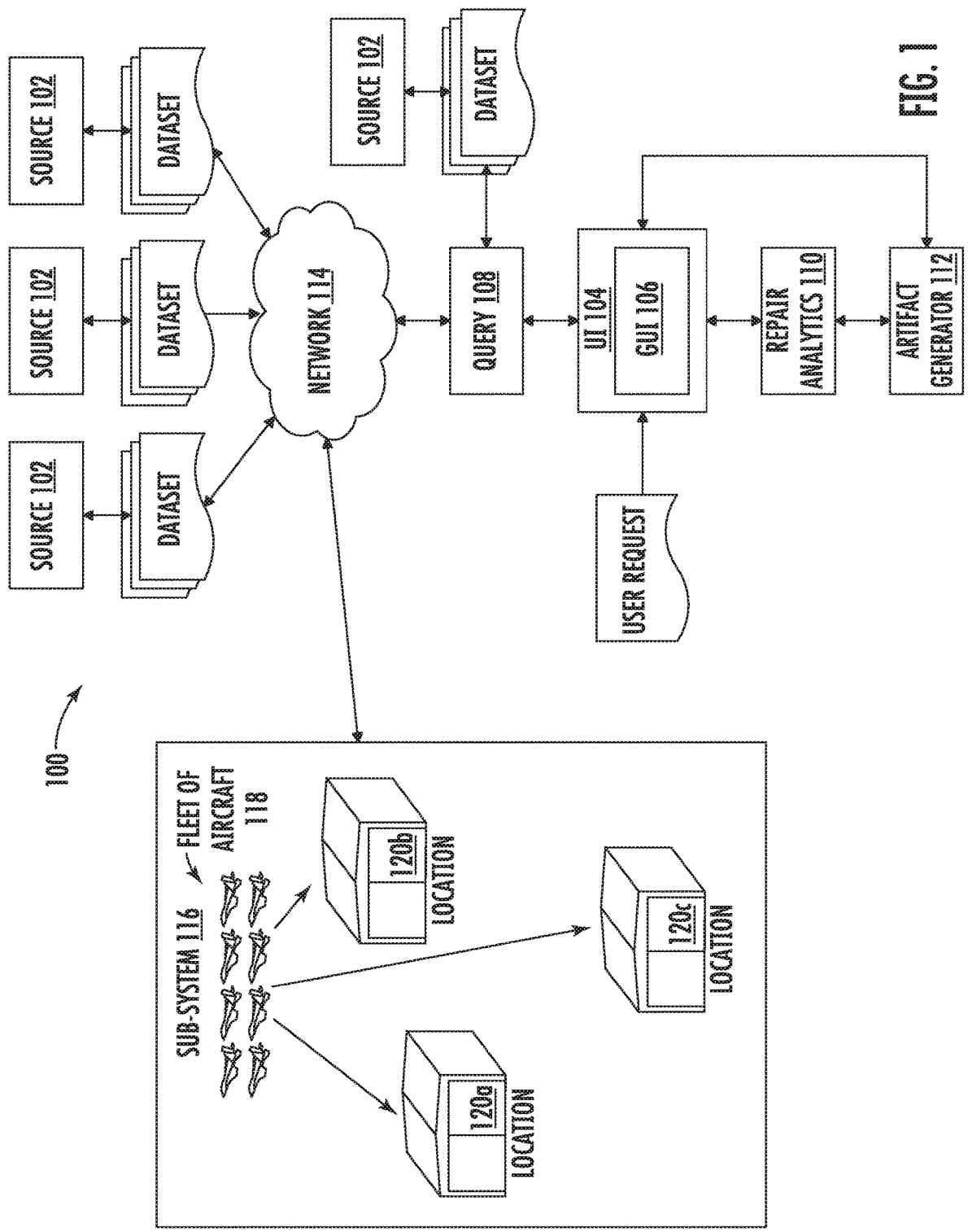
FIG. 1 illustrates a system for supporting maintenance of a fleet of vehicles, according to example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are generally directed to maintenance of a fleet of vehicles and, in particular, to supporting maintenance of a fleet of vehicles with intuitive display of repair analytics, which takes into account at least some of the issues discussed in the Background section, and which may also address other possible issues. The system is primarily described herein in the context of a fleet of aircraft, but it should be understood that the system is equally applicable to any of a number of types of vehicles such as any of a number of different types of manned or unmanned land vehicles, aircraft, spacecraft, watercraft or the like.

According to example implementations, the display of repair analytics—sometimes arranged in and thereby referred to as a dashboard of repair analytics—gives maintenance personnel immediate access to actual repair cost and removal rate data. The display provides key repair cost details for a desired date range, and perhaps also across operators, systems/structures, suppliers and/or component parts. These cost details can be viewed by in-service time, by time period and/or by the repair charge type. In addition, a repair cost and reliability core table may provide a break down, by component part, and include the actual repair cost from appropriate source(s) of relevant datasets, where available.

FIG. 1 illustrates a system 100 for supporting maintenance of a fleet of vehicles, according to example implementations of the present disclosure. The system includes any of a number of different subsystems (each an individual system) for performing one or more functions or operations. As shown, in some examples, the system includes one or more of each of a source 102 of one or more datasets, a user interface (UI) module 104 configured to generate a graphical user interface (GUI) 106, a query module 108, a repair analytics module 110, and an artifact generator 112. The subsystems may be co-located or directly coupled to one another, or in some examples, various ones of the subsystems may communicate with one another across one or more computer networks 114. Further, although shown as part of the system, it should be understood that any one or more of the source, UI module, GUI, query module, repair analytics module or artifact generator may function or operate as a separate system without regard to any of the other subsystems. It should also be understood that the system may include one or more additional or alternative subsystems than those shown in FIG. 1.

As described herein, a source 102 is a source of one or more datasets for the fleet of vehicles. An example of a suitable source is a computer-based information system, although other sources are also contemplated. In some examples, the source includes storage with one or more datasets retained therein. This storage may be located at a single source or distributed across multiple sources. Examples of suitable types of storage include file storage, database storage, cloud storage or the like.

According to example implementations, the UI module 104 is configured to generate the GUI 106 to enable a user to request and receive repair analytics for a fleet of vehicles (e.g., aircraft). The system 100 may also include a sub-system 116 for in-service operation and maintenance of the fleet of vehicles (shown as a fleet of aircraft 118). The sub-system may also include a plurality of locations 120a, 120b, 120c for performing maintenance of the fleet of aircraft. For example, as shown, some aircraft of the fleet may be sent to one of the locations for maintenance, and other aircraft of the fleet may be sent to another of the locations for maintenance. In the context of a fleet of aircraft in particular, the sub-system may further include airports, air traffic control towers, operation centers, technicians or facilities for in-service operation and maintenance of the fleet of aircraft (not shown in FIG. 1 for simplicity of illustration). The sub-system is generally configured to perform maintenance on the fleet of vehicles according to the repair analytics from the GUI, which may be improved relative to maintenance performed without the repair analytics according to existing techniques.

Figure 2:
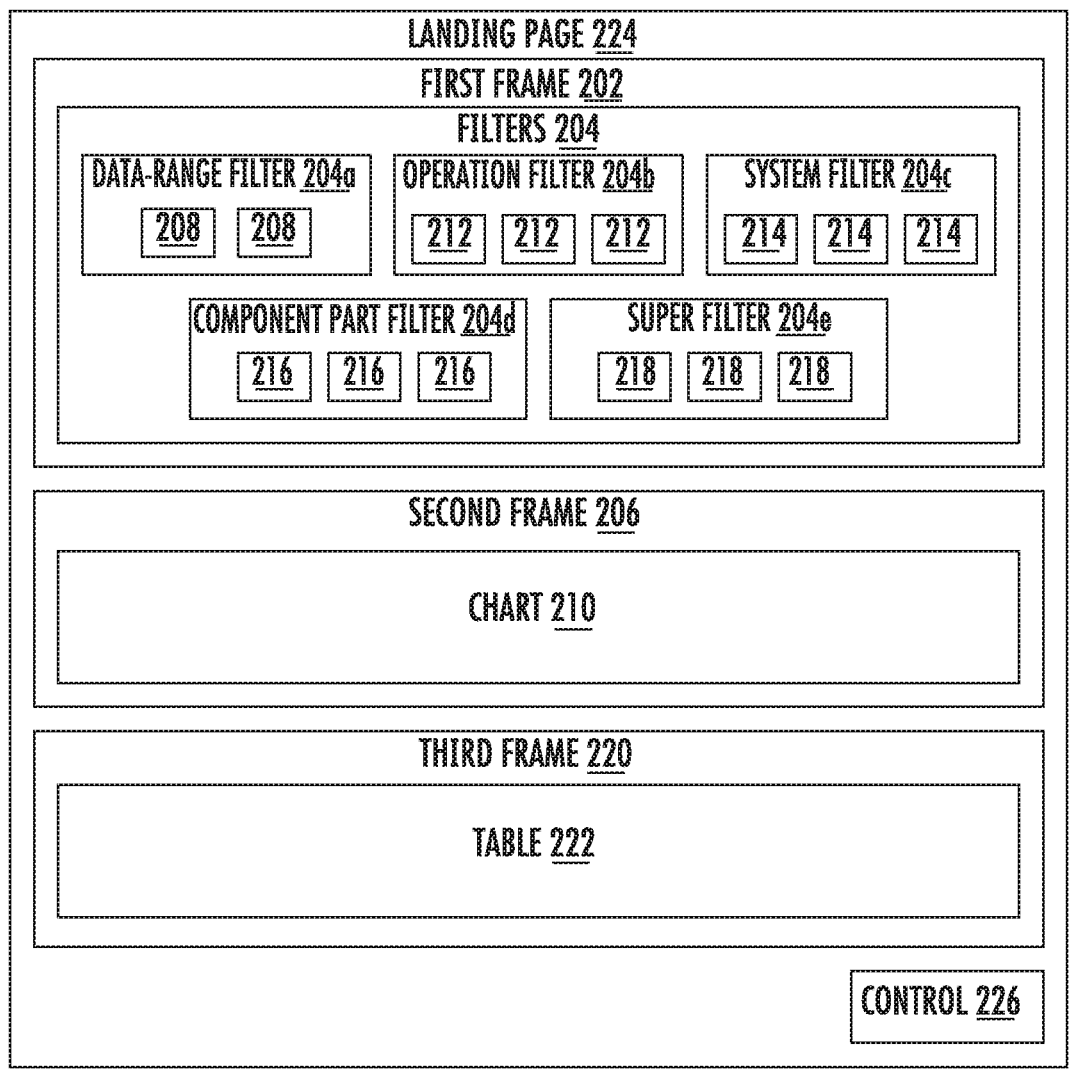
FIG. 2 illustrates a suitable graphical user interface (GUI), according to example implementations.

FIG. 2 illustrates more particularly illustrates the GUI 106 according to some example implementations. As shown, the GUI includes a first frame 202 within which a collection of filters 204 are grouped to allow a user to filter repair analytics for the fleet of vehicles, and a second frame 206 within which at least some of the repair analytics are displayed. As used herein, a frame (in some contexts referred to as a fieldset) is a box or other visual container within which content and/or graphical control elements can be grouped, and which may but need not be individually scrollable. The first frame may include a number of different filters such as a date-range filter 204a with one or more graphical control elements 208 to enable the user to select a date range for the repair analytics. Examples of suitable graphical control elements include date pickers, text boxes, buttons (e.g., radio buttons, check boxes, split buttons, cycle buttons), sliders, list boxes, spinners, drop-down lists or the like. Other suitable filters may include an operator filter 204b for operators of the vehicles, a system filter 204c for systems or structures of the vehicles, a component-part filter 204d for component parts of the vehicles, a supplier filter 204e for suppliers of component parts, or the like.

The GUI 106 may implement dynamic filtering that reduces filter options based on previously selected filters. In one example, a hierarchy for dynamic filters may be as follows: operator filters the available systems/structures-→systems/structures filters the available suppliers→supplier filters the available component parts. When selecting values from the collection of filters with dynamic filtering, filters lower in the hierarchy may populate with available options. The first frame 202 may also provide a quick view summary of the total operators and total component parts that are selected in the collection of filters and have data associated with them in a selected date range.

Turning back to FIG. 1 and with further reference to FIG. 2, the UI module 104 is configured to receive a user request for repair analytics for the fleet of vehicles via the GUI 106, including user selection of the date range via the date-range filter 204a. The query module 108 is configured to interpret the user request to produce a query of dataset(s) for the fleet of vehicles. In some examples, the dataset(s) include an in-service time (e.g., flight hours) for vehicles of the fleet of vehicles, and repair transactions including repair costs for the vehicles. The query module is also configured to execute the query of the dataset(s) for data of the vehicles of the fleet of vehicles. In some examples, this data includes the in-service time and the repair costs over the date range for the vehicles.

The repair analytics module 110 is configured to determine a moving average repair cost per unit of in-service time for a plurality of time periods within the date range from the in-service time and the repair costs. The artifact generator 112 is then configured to generate a moving-average-repair-cost (MARC) chart 210 in the second frame 206 of the GUI 106. The MARC chart graphically illustrates the moving average repair cost per unit of in-service time for the plurality of time periods. The MARC chart may illustrate this data in any of a number of different manners such as by bars in a bar chart, lines in a line chart or slices in a pie chart.

In the context of a fleet of aircraft, the moving average repair cost per unit of in-service time may involve flight hours such as a total sum of flight hours. A monthly moving average may be determined by taking the sum of repair cost for the number of months and dividing by the total months. Repair cost per flight hour may be determined as follows: Total Part Repair Cost ($)/Total Flight Hours. A three-month moving average may be determined as follows: ((SUM(M))+SUM(M−1)+SUM(M−2))/3, where M represents the repair cost per flight hour for the current month.

In some examples, the vehicles of the fleet of vehicles are operated by vehicle operators (e.g., airlines), and the collection of filters 204 further include the operator filter 204b with a second one or more graphical control elements 212 to enable the user to select one or more of the vehicle operators that operate a subset of the vehicles. In these examples, the dataset(s) identify the vehicles by vehicle operator of the vehicle operators. Also in these examples, the user request further includes user selection of vehicle operator(s) via the operator filter. The query module 108 is configured to execute the query for the data including the in-service time and the repair costs for only the subset of the vehicles operated by the vehicle operator(s). The repair analytics module 110 is configured to determine the moving average repair cost per unit of in-service time for the plurality of time periods within the date range from the in-service time and the repair costs for only the subset of the vehicles.

In some examples, the vehicles of the fleet of vehicles include component parts of systems or structures of the vehicles, and the collection of filters 204 further include the system filter 204c with a second one or more graphical control elements 214 to enable the user to select one or more of the systems or structures that include a subset of the component parts. In the context of aircraft, the systems or structures may be organized by the Air Transport Association (ATA) numbering system for aircraft documentation, which is referenced in the ATA 100 Chapter System. In these examples, the repair transactions in the dataset(s) identify the repair costs by component part of the component parts. Also in these examples, the user request further includes user selection of system(s) or structure(s) via the system filter. The query module 108 is configured to execute the query for the data including the in-service time and the repair costs for only the subset of the component parts in the system(s) or structure(s). The repair analytics module 110 is configured to determine the moving average repair cost per unit of in-service time for the plurality of time periods within the date range from the in-service time and the repair costs for only the subset of the component parts.

In some examples, the vehicles of the fleet of vehicles include component parts, and the collection of filters 204 further include the component-part filter 204d with a second one or more graphical control elements 216 to enable the user to select one or more of the component parts. In these examples, the repair transactions in the dataset(s) identify the repair costs by component part of the component parts. Also in these examples, the user request further includes user selection of component part(s) via the component-part filter. The query module 108 is configured to execute the query for the data including the in-service time and the repair costs for only the component part(s). The repair analytics module 110 is configured determine the moving average repair cost per unit of in-service time for the plurality of time periods within the date range from the in-service time and the repair costs for only the component part(s).

In some examples, the vehicles of the fleet of vehicles include component parts supplied by component part suppliers, and the collection of filters further include the supplier filter 204e with a second one or more graphical control elements 218 to enable the user to select component part supplier(s) that supply a subset of the component parts. In these examples, the repair transactions in the dataset(s) identify the repair costs by component part of the component parts. Also in these examples, the user request further includes user selection of component part supplier(s) via the supplier filter. The query module 108 is configured to execute the query for the data including the in-service time and the repair costs for only the subset of the component parts supplied by the component part supplier(s). The repair analytics module 110 is configured to determine the moving average repair cost per unit of in-service time for the plurality of time periods within the date range from the in-service time and the repair costs for only the subset of the component parts.

In some examples, the GUI 106 further includes a third frame 220 within which at least some of the repair analytics are displayed, and the repair transactions in the dataset(s) identify the repair costs by charge type of a plurality of charge types for the repair costs. In these examples, the repair analytics module 110 is further configured to determine a repair cost and percentage of number of repair transactions or total repair cost over the date range for each of the plurality of charge types from the repair costs for the vehicles. The artifact generator 112 is configured to generate a charge-type table 222 in the third frame of the GUI. This t charge-type able identifies the plurality of charge types, and the repair cost and percentage of number of repair transactions or total repair cost for each of the plurality of charge types. An unassigned charge type may be included in or alongside the table to provide the count and cost of the total repair transactions that are currently unassigned responsibility or NULL in a repair charge type description. It may also include any repair that shows NULL in an operator indicator.

In some examples, the vehicles of the fleet of vehicles include component parts of systems or structures of the vehicles, and the repair transactions in the dataset(s) identify the repair costs by component part of the component parts. In these examples, the first frame 202 and the second frame 206 are on a landing page 224 of the GUI 106 that also includes a further graphical control element 226 that when user selected, causes display of a second page 228 of the GUI within which further repair analytics are displayed. Also in these examples, the UI module 104 is further configured to receive user selection of the further graphical control element. The repair analytics module 110 is configured to determine a total repair cost per unit of in-service time over the date range for each of a select one or more of the systems or structures that include a subset of the component parts. The artifact generator 112 is configured to generate a system-structure chart 230 on the second page of the GUI. This system-structure chart graphically illustrates numerical proportions of the total repair cost per unit of in-service time for the select system(s) or structure(s).

In the context of a fleet of aircraft, this system-structure chart 230 may summarize the total repair cost by flight hour for selected ATA(s). It may include cross filtering capability to allow for quick drill downs in a table on the second page 228 (described below as component-part table 236) to component part details that are included in the selected ATA(s). There may also be the ability to hover over any part of the chart to view the data associated with the ATA. Repair cost by flight hour may be determined as follows: Sum of Total Component Part Repair Cost/Maximum Flight Hours. Here, the Sum of Total Component Part Repair Cost represents the total repair cost of selected component parts, and the Maximum Flight Hours represents the highest count of flight hours from the selected component parts.

In some examples, the vehicles of the fleet of vehicles include component parts supplied by component part suppliers, and the repair transactions in the dataset(s) identify the repair costs by component part of the component parts. In these examples, the repair analytics module 110 is configured to determine a total repair cost over the date range for each of a select one or more of the component part suppliers that supply a subset of the component parts. The artifact generator 112 is configured to generate a part-supplier chart 232 on the second page 228 of the GUI 106. This part-supplier chart graphically illustrates numerical proportions of the total repair cost for the select component part supplier(s).

For a fleet of aircraft, the part-supplier chart 232 may summarize the total repair cost for selected supplier(s). This part-supplier chart may also include cross filtering capability to allow for quick dill downs in the table on the second page 228 to the part number details from the selected supplier(s). There may also the ability to hover over any component part of the chart to view the data associated with the supplier.

In some examples in which the repair transactions in the one or more datasets identify the repair costs by charge type of a plurality of charge types for the repair costs, the repair analytics module 110 is configured to determine a percentage of number of repair transactions or total repair cost over the date range for each of the plurality of charge types from the repair costs for the vehicles. In these examples, the artifact generator 112 is configured to generate a charge-type chart 234 on the second page 228 of the GUI 106. This charge-type chart graphically illustrates numerical proportions of the percentage of number of repair transactions or total repair cost for the plurality of charge types.

For a fleet of aircraft, the charge-type chart 234 may provide a breakdown by percentage for all of the included repair charge types. There may also be the ability to hover over any component part of the chart to view the data associated with the repair charge type category. The repair cost by charge type may be the total part repair cost for a single charge type. Repair percentage by charge type may be this total part repair cost divided by the total part repair cost.

In some examples, the vehicles of the fleet of vehicles include component parts, and the repair transactions in the one or more datasets identify the repair costs by component part of the component parts. In these examples, the repair analytics module 110 is configured to determine for each component part of at least a subset of component parts, a repair cost per unit of in-service time over the date range from the in-service time and the repair costs. The artifact generator 112 is configured to generate a component-part table 236 on the second page 228 of the GUI 106. This component-part table identifies the subset of the component parts and at least the repair cost per unit of in-service time over the date range for each component part of the subset of the component parts.

The component-part table 236 may include key part cost, returns by charge type and removal rates displayed at the part number level for the user selected date range in the dashboard filters. The formulas that include flight hour totals may use the true part flight hours based on relevant data (e.g., from service bulletin incorporation data). Each calculation may be completed at a component part level. A number of columns in the table may provide component part name and number, and in the context of aircraft, ATA chapter, supplier and quantity per aircraft (QPA). Other columns in the table include repair cost per flight hour, repair cost per month, total flight hours, mean time between unscheduled removals (MTBUR), mean time between faults (MTBF), mean time between removals (MTBR), and the like.

Figure 3A:
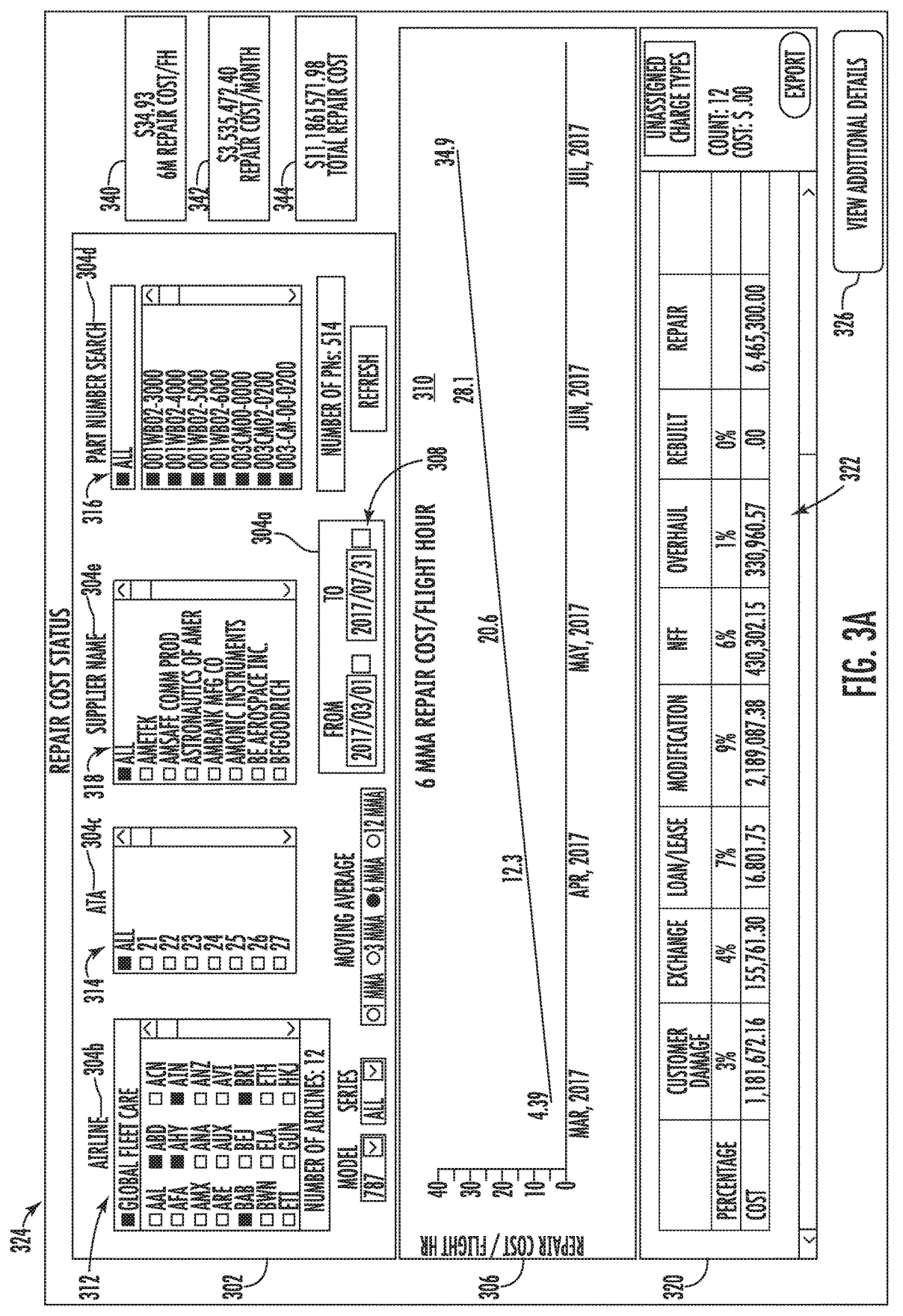

To further illustrate the example implementations of the present disclosure, FIGS. 3A and 3B illustrate a landing page 324 and second page 328 that may correspond to respectively the landing page 224 and second page 228 in some examples.

As shown, the landing page 324 includes a first frame 302 (first frame 202) within which a collection of filters are grouped to allow a user to filter repair analytics for the fleet of aircraft, and a second frame 306 (second frame 206) within which at least some of the repair analytics are displayed. The collection of filters in the first frame include a date-range filter 304a (date-range filter 204a) with date pickers 308 (graphical control elements 208) to enable the user to select a date range for the repair analytics. An airline filter 304b (operator filter 204b) includes check boxes 312 (graphical control elements 212) for selection of airlines. An ATA filter 304c (system filter 204c) includes check boxes 314 (graphical control elements 214) for selection of ATA chapters in which systems or structures of the aircraft are organized. A part number filter 304d (component-part filter 204d) includes check boxes 316 (graphical control elements 216) for selection of component parts of the aircraft. A supplier filter 304e (supplier filter 204e) includes check boxes 318 (graphical control elements 218) for selection of suppliers of component parts. These may be implemented in a hierarchy for dynamic filters such as follows: airline filters the available ATAs→ATA filters the available suppliers→supplier filters the available component parts. The first frame also includes filters for selection of model and series of aircraft, and length of a moving monthly average (MMA).

The second frame 306 of the landing page 324 includes a line chart 310 (MARC chart 210) that graphically illustrates a three month moving average repair cost per flight hour (unit of in-service time) for a plurality of time periods within a desired date range selected in the date-range filter 304a, further limited by any specific airlines, ATAs, component parts and suppliers selected in the respective filters 304b-304e in the first frame 302. As also shown, the landing page includes a third frame 320 (third frame 220) within which at least some of the repair analytics are displayed. This includes a table 322 (charge-type table 222) that identifies the plurality of charge types, and the repair cost and percentage of number of repair transactions or total repair cost for each of the plurality of charge types, again limited or otherwise filtered by the respective filters 304a-304e in the first frame. The landing page also includes a "view additional details" button 326 (further graphical control element 226) that when user selected, causes display of the second page 328 of the GUI within which further repair analytics are displayed. Even further, the landing page includes cost summary boxes 340, 342 and 344 that display respectively repair cost per flight hour, repair cost per month, and total repair cost.

As shown in FIG. 3B, the second page 328 includes a pie chart 330 (system-structure chart 230) that graphically illustrates numerical proportions of the total repair cost per flight hour for select ATA chapters (or even all ATA chapters), and a second pie chart 332 that graphically illustrates numerical proportions of the total repair cost for select component part suppliers (or even all suppliers). The second page includes a bar chart 334 (charge-type chart 234) that graphically illustrates numerical proportions of the percentage of number of repair transactions for a plurality of charge types. The second page also includes a table 336 (component-part table 236) that identifies at least a subset of component parts and at least the repair cost per flight hour over the desired date range for each component part of the subset of the component parts.

Figure 4:
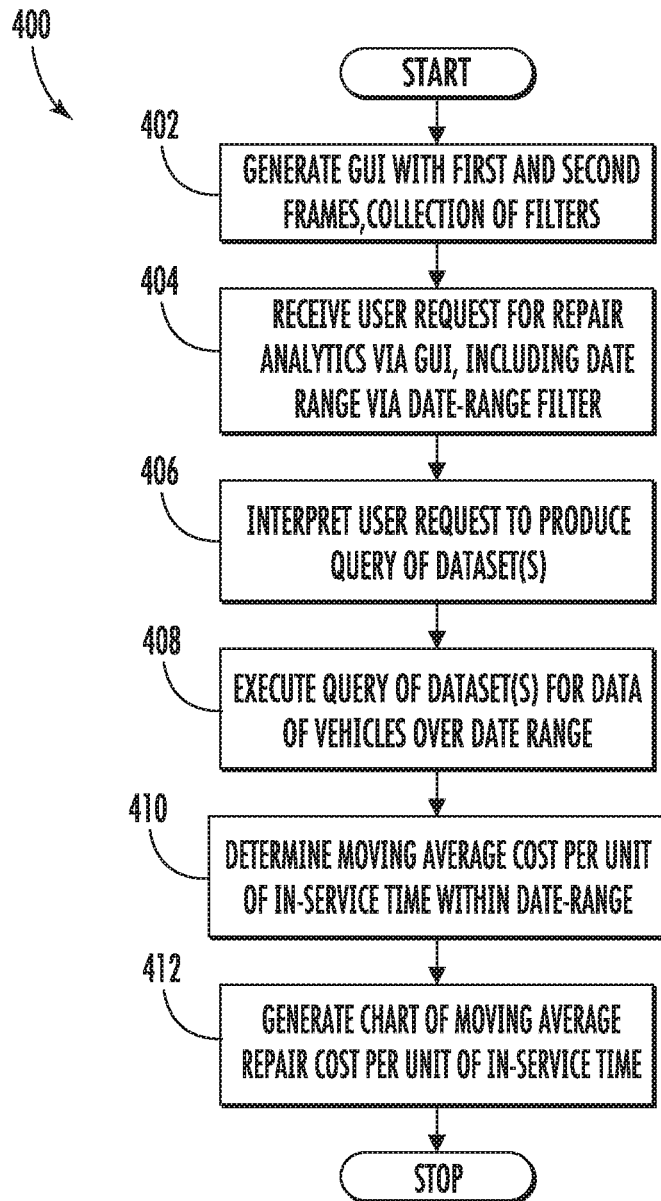
FIG. 4 is a flowchart illustrating various steps in a method of supporting maintenance of a fleet of vehicles, according to various example implementations.

FIG. 4 is a flowchart illustrating various steps in a method 400 of supporting maintenance of a fleet of vehicles, according to example implementations of the present disclosure. As shown at block 402, the method includes executing a computer-readable program code via processing circuitry to generate a graphical user interface (GUI) 106 to enable a user to request and receive repair analytics for a fleet of vehicles. See, for example, FIG. 5, processing circuitry 502 and memory 504. The GUI includes a first frame 202 within which a collection of filters 204 are grouped, and the collection of filters include a date-range filter 204a with one or more graphical control elements 208 to enable the user to select a date range for the repair analytics. The GUI also includes a second frame 206 within which at least some of the repair analytics are displayed.

The method 400 includes receiving a user request for repair analytics for the fleet of vehicles via the GUI 106, including user selection of the date range via the date-range filter 204a, as shown at block 404. The method includes interpreting the user request to produce a query of one or more datasets for the fleet of vehicles, as shown at block 406. The method includes executing the query of the one or more datasets for data of the vehicles of the fleet of vehicles, as shown at block 408. The dataset(s) include an in-service time for vehicles of the fleet of vehicles, and repair transactions including repair costs for the vehicles; and the data includes the in-service time and the repair costs over the date range for the vehicles.

The method 400 includes determining a moving average repair cost per unit of in-service time for a plurality of time periods within the date range from the in-service time and the repair costs, as shown at block 410. And the method includes generating a MARC chart 210 in the second frame 206 of the GUI 106, as shown at block 412. In this regard, the chart graphically illustrates the moving average repair cost per unit of in-service time for the plurality of time periods.

There are many advantages of example implementations of the present disclosure. Example implementations may support fleet materials services in which users may have the ability to aggregate component part demand on an individual part level by leveraging the collection of filters 204 of the GUI 106. This may improve resource utilization and optimization of parts inventory quantities to reduce overall costs for component services programs.

Example implementations may support fleet engineering services in which users may have the ability to monitor historical component part repair trends and identify root cause and corrective action candidates to enable cost recovery initiatives. This may reduce component part maintenance costs to component services programs by identifying a party responsible for mitigation costs. Component services may also be able to predict component part shortages and allocate additional resources to proactively prevent service interruptions.

Example implementations may support supplier management in which users may have the ability to aggregate component part repair data to improve supplier management purchase power through economies of scale and evaluate maintenance, repair and operations (MRO) offers likelihood of meeting long-range business targets. This may reduce repair and overhaul costs and improve the ability to confirm that financial targets will be met.

Fleet materials services/supplier management may benefit from example implementations. Users may have the ability to leverage inventory forecasting for individual operators to predict probable pool shortages and seek warranty remedies. By obtaining warranty remedies for individual operators before the fleet pool is effected, component services programs may prevent shortages and eliminate or reduce customer impacts.

Supplier management may benefit with users being notified through automated alerting when specific remedies are available to obtain free-of-charge support from an original equipment manufacturer (OEM) or supplier. This may prevent overbuying when an OEM or supplier is responsible for a component part shortage. Reacting before the pool is depleted may allow component services to prevent service interruptions.

Supplier management/finance may benefit with users having the ability to view the moving average repair cost per unit of in-service time for the fleet or individual operators to track profitability. A user may be able to filter by vehicle model, supplier and component part to compare with forecasted cost. Supplier management may gain new capability to metric supplier performance on a cost basis. Finance may be able to accurately predict profit performance and identify cost improvement opportunities.

Example implementations may further benefit business development in which users may have the ability to generate component service program proposals by leveraging the GUI 106 to automate the repair and overhaul costs forecasts calculation process. The time it takes to generate proposals may be reduced from multiple days to minutes and require less headcount. The quality of cost calculations may increase by removing manual errors generated through previous.

According to example implementations of the present disclosure, the system 100 and its subsystems including the source 102, UI module 104, query module 108, repair analytics module 110 and an artifact generator 112 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 5:
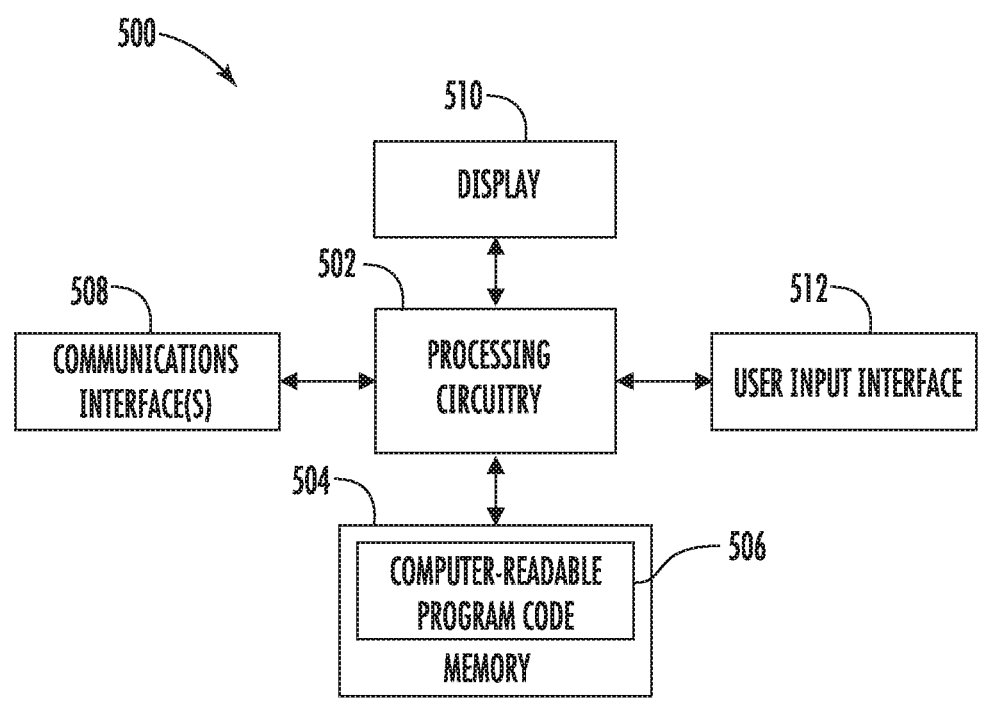
FIG. 5 illustrates an apparatus according to some example implementations.

FIG. 5 illustrates an apparatus 500 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 502 (e.g., processor unit) connected to a memory 504 (e.g., storage device).

The processing circuitry 502 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 504 (of the same or another apparatus).

The processing circuitry 502 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 504 is generally any piece of computer hardware that is capable of storing information such as, for example, data, computer programs (e.g., computer-readable program code 506) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 504, the processing circuitry 502 may also be connected to one or more interfaces for displaying, transmitting and/or receiving information. The interfaces may include a communications interface 508 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 510 and/or one or more user input interfaces 512 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 500 may include a processing circuitry 502 and a computer-readable storage medium or memory 504 coupled to the processing circuitry, where the processing circuitry is configured to execute computer-readable program code 506 stored in the memory. It will also be understood that one or more functions, and combinations of functions, may be implemented by special purpose hardware-based computer systems and/or processing circuitry s which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for supporting maintenance of a fleet of vehicles, the apparatus comprising:
  a non-transitory computer-readable storage medium storing computer-readable program code; and
  a processing circuitry configured to access the non-transitory computer-readable storage medium, and execute the computer-readable program code to cause the apparatus to at least:
    generate a graphical user interface (GUI) to enable a user to request and receive repair analytics for a fleet of vehicles, the GUI including a first frame within which a collection of filters are grouped, the collection of filters including a date-range filter with one or more graphical control elements to enable the user to select a date range for the repair analytics, and the GUI including a second frame within which at least some of the repair analytics are displayed;
    receive a user request for repair analytics for the fleet of vehicles via the GUI, including user selection of the date range via the date-range filter;
    interpret the user request to produce a query of one or more datasets for the fleet of vehicles, the one or more datasets including an in-service time for vehicles of the fleet of vehicles, and repair transactions including repair costs for the vehicles;
    execute the query of the one or more datasets for data of the vehicles of the fleet of vehicles, the data including the in-service time and the repair costs over the date range for the vehicles;

determine a moving average repair cost per unit of in-service time for a plurality of time periods within the date range from the in-service time and the repair costs; and generate a moving-average-repair-cost (MARC) chart in the second frame of the GUI, the MARC chart graphically illustrating the moving average repair cost per unit of in-service time for the plurality of time periods wherein the GUI further includes a third frame within which at least some of the repair analytics are displayed, and the repair transactions in the one or more datasets identify the repair costs by charge type of a plurality of charge types for the repair costs, and wherein the processing circuitry is configured to execute the computer-readable program code to cause the apparatus to further at least:

determine a repair cost and percentage of number of repair transactions or total repair cost over the date range for each of the plurality of charge types from the repair costs for the vehicles; and generate a charge-type table in the third frame of the GUI, the charge-type table identifying the plurality of charge types, and the repair cost and percentage of number of repair transactions or total repair cost for each of the plurality of charge types.

2. The apparatus of claim 1, wherein the vehicles of the fleet of vehicles are operated by vehicle operators, the collection of filters further include an operator filter with a second one or more graphical control elements to enable the user to select one or more of the vehicle operators that operate a subset of the vehicles, and the one or more datasets identify the vehicles by vehicle operator of the vehicle operators, and wherein the apparatus being caused to receive the user request further includes being caused to receive user selection of the one or more of the vehicle operators via the operator filter, the apparatus being caused to execute the query includes being caused to execute the query for the data including the in-service time and the repair costs for only the subset of the vehicles operated by the one or more of the vehicle operators, and the apparatus being caused to determine the moving average repair cost per unit of in-service time includes being caused to determine the moving average repair cost per unit of in-service time for the plurality of time periods within the date range from the in-service time and the repair costs for only the subset of the vehicles.

3. The apparatus of claim 1, wherein the vehicles of the fleet of vehicles include component parts of systems or structures of the vehicles, the collection of filters further include a system filter with a second one or more graphical control elements to enable the user to select one or more of the systems or structures that include a subset of the component parts, and the repair transactions in the one or more datasets identify the repair costs by component part of the component parts, and wherein the apparatus being caused to receive the user request further includes being caused to receive user selection of the one or more of the systems or structures via the system filter, the apparatus being caused to execute the query includes being caused to execute the query for the data including the in-service time and the repair costs for only the subset of the component parts in the one or more of the systems or structures, and the apparatus being caused to determine the moving average repair cost per unit of in-service time includes being caused to determine the moving average repair cost per unit of in-service time for the plurality of time periods within the date range from the in-service time and the repair costs for only the subset of the component parts.

4. The apparatus of claim 1, wherein the vehicles of the fleet of vehicles include component parts, the collection of filters further include a component-part filter with a second one or more graphical control elements to enable the user to select one or more of the component parts, and the repair transactions in the one or more datasets identify the repair costs by component part of the component parts, and wherein the apparatus being caused to receive the user request further includes being caused to receive user selection of the one or more of the component parts via the component-part filter, the apparatus being caused to execute the query includes being caused to execute the query for the data including the in-service time and the repair costs for only the one or more of the component parts, and the apparatus being caused to determine the moving average repair cost per unit of in-service time includes being caused to determine the moving average repair cost per unit of in-service time for the plurality of time periods within the date range from the in-service time and the repair costs for only the one or more of the component parts.

5. The apparatus of claim 1, wherein the vehicles of the fleet of vehicles include component parts supplied by component part suppliers, the collection of filters further include a supplier filter with a second one or more graphical control elements to enable the user to select one or more of the component part suppliers that supply a subset of the component parts, and the repair transactions in the one or more datasets identify the repair costs by component part of the component parts, and wherein the apparatus being caused to receive the user request further includes being caused to receive user selection of the one or more of the component part suppliers via the supplier filter, the apparatus being caused to execute the query includes being caused to execute the query for the data including the in-service time and the repair costs for only the subset of the component parts supplied by the one or more of the component part suppliers, and the apparatus being caused to determine the moving average repair cost per unit of in-service time includes being caused to determine the moving average repair cost per unit of in-service time for the plurality of time periods within the date range from the in-service time and the repair costs for only the subset of the component parts.

6. The apparatus of claim 1, wherein the vehicles of the fleet of vehicles include component parts of systems or structures of the vehicles, and the repair transactions in the one or more datasets identify the repair costs by component part of the component parts, wherein the first frame and the second frame are on a landing page of the GUI that also includes a further graphical control element that when user selected, causes display of a second page of the GUI within which further repair analytics are displayed, and the processing circuitry is configured to execute the computer-readable program code to cause the apparatus to further at least:

receive user selection of the further graphical control element;

determine a total repair cost per unit of in-service time over the date range for each of a select one or more of the systems or structures that include a subset of the component parts; and generate a system-structure chart on the second page of the GUI, the system-structure chart graphically illustrating numerical proportions of the total repair cost per unit of in-service time for the select one or more of the systems or structures.

7. The apparatus of claim 1, wherein the vehicles of the fleet of vehicles include component parts supplied by component part suppliers, and the repair transactions in the one or more datasets identify the repair costs by component part of the component parts, wherein the first frame and the second frame are on a landing page of the GUI that also includes a further graphical control element that when user selected, causes display of a second page of the GUI within which further repair analytics are displayed, and the processing circuitry is configured to execute the computer-readable program code to cause the apparatus to further at least:

receive user selection of the further graphical control element;

determine a total repair cost over the date range for each of a select one or more of the component part suppliers that supply a subset of the component parts; and generate a part-supplier chart on the second page of the GUI, the part-supplier chart graphically illustrating numerical proportions of the total repair cost for the select one or more of the component part suppliers.

8. The apparatus of claim 1, wherein the repair transactions in the one or more datasets identify the repair costs by charge type of a plurality of charge types for the repair costs, wherein the first frame and the second frame are on a landing page of the GUI that also includes a further graphical control element that when user selected, causes display of a second page of the GUI within which further repair analytics are displayed, and the processing circuitry is configured to execute the computer-readable program code to cause the apparatus to further at least:

receive user selection of the further graphical control element;

determine a percentage of number of repair transactions or total repair cost over the date range for each of the plurality of charge types from the repair costs for the vehicles; and generate a charge-type chart on the second page of the GUI, the charge-type chart graphically illustrating numerical proportions of the percentage of number of repair transactions or total repair cost for the plurality of charge types.

9. The apparatus of claim 1, wherein the vehicles of the fleet of vehicles include component parts, and the repair transactions in the one or more datasets identify the repair costs by component part of the component parts, wherein the first frame and the second frame are on a landing page of the GUI that also includes a further graphical control element that when user selected, causes display of a second page of the GUI within which further repair analytics are displayed, and the processing circuitry is configured to execute the computer-readable program code to cause the apparatus to further at least:

receive user selection of the further graphical control element;

determine for each component part of at least a subset of component parts, a repair cost per unit of in-service time over the date range from the in-service time and the repair costs; and generate a component-part table on the second page of the GUI, the component-part table identifying the subset of the component parts and at least the repair cost per unit of in-service time over the date range for each component part of the subset of the component parts.

10. A method of supporting maintenance of a fleet of vehicles, the method comprising:

executing a computer-readable program code via a processing circuitry to generate a graphical user interface (GUI) to enable a user to request and receive repair analytics for a fleet of vehicles, the GUI including a first frame within which a collection of filters are grouped, the collection of filters including a date-range filter with one or more graphical control elements to enable the user to select a date range for the repair analytics, and the GUI including a second frame within which at least some of the repair analytics are displayed;

receiving a user request for repair analytics for the fleet of vehicles via the GUI, including user selection of the date range via the date-range filter;

interpreting the user request to produce a query of one or more datasets for the fleet of vehicles, the one or more datasets including an in-service time for vehicles of the fleet of vehicles, and repair transactions including repair costs for the vehicles;

executing the query of the one or more datasets for data of the vehicles of the fleet of vehicles, the data including the in-service time and the repair costs over the date range for the vehicles;

determining a moving average repair cost per unit of in-service time for a plurality of time periods within the date range from the in-service time and the repair costs; and generating a moving-average-repair-cost (MARC) chart in the second frame of the GUI, the MARC chart graphically illustrating the moving average repair cost per unit of in-service time for the plurality of time periods wherein the GUI further includes a third frame within which at least some of the repair analytics are displayed, and the repair transactions in the one or more datasets identify the repair costs by charge type of a plurality of charge types for the repair costs, and wherein the method further comprises: determining a repair cost and percentage of number of repair transactions or total repair cost over the date range for each of the plurality of charge types from the repair costs for the vehicles; and generating a charge-type table in the third frame of the GUI, the charge-type table identifying the plurality of charge types, and the repair cost and percentage of number of repair transactions or total repair cost for each of the plurality of charge types.

11. The method of claim 10, wherein the vehicles of the fleet of vehicles are operated by vehicle operators, the collection of filters further include an operator filter with a second one or more graphical control elements to enable the user to select one or more of the vehicle operators that operate a subset of the vehicles, and the one or more datasets identify the vehicles by vehicle operator of the vehicle operators, and wherein receiving the user request further includes receiving user selection of the one or more of the vehicle operators via the operator filter, executing the query includes executing the query for the data including the in-service time and the repair costs for only the subset of the vehicles operated by the one or more of the vehicle operators, and determining the moving average repair cost per unit of in-service time includes determining the moving average repair cost per unit of in-service time for the plurality of time periods within the date range from the in-service time and the repair costs for only the subset of the vehicles.

12. The method of claim 10, wherein the vehicles of the fleet of vehicles include component parts of systems or structures of the vehicles, the collection of filters further include a system filter with a second one or more graphical control elements to enable the user to select one or more of the systems or structures that include a subset of the component parts, and the repair transactions in the one or more datasets identify the repair costs by component part of the component parts, and wherein receiving the user request further includes receiving user selection of the one or more of the systems or structures via the system filter, executing the query includes executing the query for the data including the in-service time and the repair costs for only the subset of the component parts in the one or more of the systems or structures, and determining the moving average repair cost per unit of in-service time includes determining the moving average repair cost per unit of in-service time for the plurality of time periods within the date range from the in-service time and the repair costs for only the subset of the component parts.

13. The method of claim 10, wherein the vehicles of the fleet of vehicles include component parts, the collection of filters further include a component-part filter with a second one or more graphical control elements to enable the user to select one or more of the component parts, and the repair transactions in the one or more datasets identify the repair costs by component part of the component parts, and wherein receiving the user request further includes receiving user selection of the one or more of the component parts via the component-part filter, executing the query includes executing the query for the data including the in-service time and the repair costs for only the one or more of the component parts, and determining the moving average repair cost per unit of in-service time includes determining the moving average repair cost per unit of in-service time for the plurality of time periods within the date range from the in-service time and the repair costs for only the one or more of the component parts.

14. The method of claim 10, wherein the vehicles of the fleet of vehicles include component parts supplied by component part suppliers, the collection of filters further include a supplier filter with a second one or more graphical control elements to enable the user to select one or more of the component part suppliers that supply a subset of the component parts, and the repair transactions in the one or more datasets identify the repair costs by component part of the component parts, and wherein receiving the user request further includes receiving user selection of the one or more of the component part suppliers via the supplier filter, executing the query includes executing the query for the data including the in-service time and the repair costs for only the subset of the component parts supplied by the one or more of the component part suppliers, and determining the moving average repair cost per unit of in-service time includes determining the moving average repair cost per unit of in-service time for the plurality of time periods within the date range from the in-service time and the repair costs for only the subset of the component parts.

15. The method of claim 10, wherein the vehicles of the fleet of vehicles include component parts of systems or structures of the vehicles, and the repair transactions in the one or more datasets identify the repair costs by component part of the component parts, wherein the first frame and the second frame are on a landing page of the GUI that also includes a further graphical control element that when user selected, causes display of a second page of the GUI within which further repair analytics are displayed, and the method further comprises:

receiving user selection of the further graphical control element;

determining a total repair cost per unit of in-service time over the date range for each of a select one or more of the systems or structures that include a subset of the component parts; and generating a system-structure chart on the second page of the GUI, the system-structure chart graphically illustrating numerical proportions of the total repair cost per unit of in-service time for the select one or more of the systems or structures.

16. The method of claim 10, wherein the vehicles of the fleet of vehicles include component parts supplied by component part suppliers, and the repair transactions in the one or more datasets identify the repair costs by component part of the component parts, wherein the first frame and the second frame are on a landing page of the GUI that also includes a further graphical control element that when user selected, causes display of a second page of the GUI within which further repair analytics are displayed, and the method further comprises:

receiving user selection of the further graphical control element;

determining a total repair cost over the date range for each of a select one or more of the component part suppliers that supply a subset of the component parts; and generating a part-supplier chart on the second page of the GUI, the part-supplier chart graphically illustrating numerical proportions of the total repair cost for the select one or more of the component part suppliers.

17. The method of claim 10, wherein the repair transactions in the one or more datasets identify the repair costs by charge type of a plurality of charge types for the repair costs, wherein the first frame and the second frame are on a landing page of the GUI that also includes a further graphical control element that when user selected, causes display of a second page of the GUI within which further repair analytics are displayed, and the method further comprises:

receiving user selection of the further graphical control element;

determining a percentage of number of repair transactions or total repair cost over the date range for each of the plurality of charge types from the repair costs for the vehicles; and generating a charge-type chart on the second page of the GUI, the charge-type chart graphically illustrating numerical proportions of the percentage of number of repair transactions or total repair cost for the plurality of charge types.

18. The method of claim 10, wherein the vehicles of the fleet of vehicles include component parts, and the repair transactions in the one or more datasets identify the repair costs by component part of the component parts, wherein the first frame and the second frame are on a landing page of the GUI that also includes a further graphical control element that when user selected, causes display of a second page of the GUI within which further repair analytics are displayed, and the method further comprises:

receiving user selection of the further graphical control element;

determining for each component part of at least a subset of component parts, a repair cost per unit of in-service time over the date range from the in-service time and the repair costs; and generating a component-part table on the second page of the GUI, the component-part table identifying the subset of the component parts and at least the repair cost per unit of in-service time over the date range for each component part of the subset of the component parts.

19. A non-transitory computer-readable storage medium for supporting maintenance of a fleet of vehicles, the computer-readable storage medium having computer-readable program code stored therein that in response to execution by a processing circuitry, causes an apparatus to at least:

generate a graphical user interface (GUI) to enable a user to request and receive repair analytics for a fleet of vehicles, the GUI including a first frame within which a collection of filters are grouped, the collection of filters including a date-range filter with one or more graphical control elements to enable the user to select a date range for the repair analytics, and the GUI including a second frame within which at least some of the repair analytics are displayed;

receive a user request for repair analytics for the fleet of vehicles via the GUI, including user selection of the date range via the date-range filter;

interpret the user request to produce a query of one or more datasets for the fleet of vehicles, the one or more datasets including an in-service time for vehicles of the fleet of vehicles, and repair transactions including repair costs for the vehicles;

execute the query of the one or more datasets for data of the vehicles of the fleet of vehicles, the data including the in-service time and the repair costs over the date range for the vehicles;

determine a moving average repair cost per unit of in-service time for a plurality of time periods within the date range from the in-service time and the repair costs; and generate a moving-average-repair-cost (MARC) chart in the second frame of the GUI, the MARC chart graphically illustrating the moving average repair cost per unit of in-service time for the plurality of time periods wherein the GUI further includes a third frame within which at least some of the repair analytics are displayed, and the repair transactions in the one or more datasets identify the repair costs by charge type of a plurality of charge types for the repair costs, and wherein the non-transitory computer-readable storage medium has further computer-readable program code stored therein that in response to execution by the processing circuitry causes the apparatus to further at least: determine a repair cost and percentage of number of repair transactions or total repair cost over the date range for each of the plurality of charge types from the repair costs for the vehicles; and generate a charge-type table in the third frame of the GUI, the charge-type table identifying the plurality of charge types, and the repair cost and percentage of number of repair transactions or total repair cost for each of the plurality of charge types.

20. The non-transitory computer-readable storage medium of claim 19, wherein the vehicles of the fleet of vehicles are operated by vehicle operators, the collection of filters further include an operator filter with a second one or more graphical control elements to enable the user to select one or more of the vehicle operators that operate a subset of the vehicles, and the one or more datasets identify the vehicles by vehicle operator of the vehicle operators, and wherein the apparatus being caused to receive the user request further includes being caused to receive user selection of the one or more of the vehicle operators via the operator filter, the apparatus being caused to execute the query includes being caused to execute the query for the data including the in-service time and the repair costs for only the subset of the vehicles operated by the one or more of the vehicle operators, and the apparatus being caused to determine the moving average repair cost per unit of in-service time includes being caused to determine the moving average repair cost per unit of in-service time for the plurality of time periods within the date range from the in-service time and the repair costs for only the subset of the vehicles.

21. The non-transitory computer-readable storage medium of claim 19, wherein the vehicles of the fleet of vehicles include component parts of systems or structures of the vehicles, the collection of filters further include a system filter with a second one or more graphical control elements to enable the user to select one or more of the systems or structures that include a subset of the component parts, and the repair transactions in the one or more datasets identify the repair costs by component part of the component parts, and wherein the apparatus being caused to receive the user request further includes being caused to receive user selection of the one or more of the systems or structures via the system filter, the apparatus being caused to execute the query includes being caused to execute the query for the data including the in-service time and the repair costs for only the subset of the component parts in the one or more of the systems or structures, and the apparatus being caused to determine the moving average repair cost per unit of in-service time includes being caused to determine the moving average repair cost per unit of in-service time for the plurality of time periods within the date range from the in-service time and the repair costs for only the subset of the component parts.

22. The non-transitory computer-readable storage medium of claim 19, wherein the vehicles of the fleet of vehicles include component parts, the collection of filters further include a component-part filter with a second one or more graphical control elements to enable the user to select one or more of the component parts, and the repair transactions in the one or more datasets identify the repair costs by component part of the component parts, and wherein the apparatus being caused to receive the user request further includes being caused to receive user selection of the one or more of the component parts via the component-part filter, the apparatus being caused to execute the query includes being caused to execute the query for the data including the in-service time and the repair costs for only the one or more of the component parts, and the apparatus being caused to determine the moving average repair cost per unit of in-service time includes being caused to determine the moving average repair cost per unit of in-service time for the plurality of time periods within the date range from the in-service time and the repair costs for only the one or more of the component parts.

23. The non-transitory computer-readable storage medium of claim 19, wherein the vehicles of the fleet of vehicles include component parts supplied by component part suppliers, the collection of filters further include a supplier filter with a second one or more graphical control elements to enable the user to select one or more of the component part suppliers that supply a subset of the component parts, and the repair transactions in the one or more datasets identify the repair costs by component part of the component parts, and wherein the apparatus being caused to receive the user request further includes being caused to receive user selection of the one or more of the component part suppliers via the supplier filter, the apparatus being caused to execute the query includes being caused to execute the query for the data including the in-service time and the repair costs for only the subset of the component parts supplied by the one or more of the component part suppliers, and the apparatus being caused to determine the moving average repair cost per unit of in-service time includes being caused to determine the moving average repair cost per unit of in-service time for the plurality of time periods within the date range from the in-service time and the repair costs for only the subset of the component parts.

24. The non-transitory computer-readable storage medium of claim 19, wherein the vehicles of the fleet of vehicles include component parts of systems or structures of the vehicles, and the repair transactions in the one or more datasets identify the repair costs by component part of the component parts, wherein the first frame and the second frame are on a landing page of the GUI that also includes a further graphical control element that when user selected, causes display of a second page of the GUI within which further repair analytics are displayed, and the non-transitory computer-readable storage medium has further computer-readable program code stored therein that in response to execution by the processing circuitry causes the apparatus to further at least:

receive user selection of the further graphical control element;

determine a total repair cost per unit of in-service time over the date range for each of a select one or more of the systems or structures that include a subset of the component parts; and generate a system-structure chart on the second page of the GUI, the system-structure chart graphically illustrating numerical proportions of the total repair cost per unit of in-service time for the select one or more of the systems or structures.

25. The non-transitory computer-readable storage medium of claim 19, wherein the vehicles of the fleet of vehicles include component parts supplied by component part suppliers, and the repair transactions in the one or more datasets identify the repair costs by component part of the component parts, wherein the first frame and the second frame are on a landing page of the GUI that also includes a further graphical control element that when user selected, causes display of a second page of the GUI within which further repair analytics are displayed, and the non-transitory computer-readable storage medium has further computer-readable program code stored therein that in response to execution by the processing circuitry causes the apparatus to further at least:

receive user selection of the further graphical control element;

determine a total repair cost over the date range for each of a select one or more of the component part suppliers that supply a subset of the component parts; and generate a part-supplier chart on the second page of the GUI, the part-supplier chart graphically illustrating numerical proportions of the total repair cost for the select one or more of the component part suppliers.

26. The non-transitory computer-readable storage medium of claim 19, wherein the repair transactions in the one or more datasets identify the repair costs by charge type of a plurality of charge types for the repair costs, wherein the first frame and the second frame are on a landing page of the GUI that also includes a further graphical control element that when user selected, causes display of a second page of the GUI within which further repair analytics are displayed, and the non-transitory computer-readable storage medium has further computer-readable program code stored therein that in response to execution by the processing circuitry causes the apparatus to further at least:

receive user selection of the further graphical control element;

determine a percentage of number of repair transactions or total repair cost over the date range for each of the plurality of charge types from the repair costs for the vehicles; and generate a charge-type chart on the second page of the GUI, the charge-type chart graphically illustrating numerical proportions of the percentage of number of repair transactions or total repair cost for the plurality of charge types.

27. The non-transitory computer-readable storage medium of claim 19, wherein the vehicles of the fleet of vehicles include component parts, and the repair transactions in the one or more datasets identify the repair costs by component part of the component parts, wherein the first frame and the second frame are on a landing page of the GUI that also includes a further graphical control element that when user selected, causes display of a second page of the GUI within which further repair analytics are displayed, and the non-transitory computer-readable storage medium has further computer-readable program code stored therein that in response to execution by the processing circuitry causes the apparatus to further at least:

receive user selection of the further graphical control element;

determine for each component part of at least a subset of component parts, a repair cost per unit of in-service time over the date range from the in-service time and the repair costs; and generate a component-part table on the second page of the GUI, the component-part table identifying the subset of the component parts and at least the repair cost per unit of in-service time over the date range for each component part of the subset of the component parts.

* * * * *